US012517616B2

(12) United States Patent
Umemura

(10) Patent No.: US 12,517,616 B2
(45) Date of Patent: Jan. 6, 2026

(54) CAPACITIVE INPUT DEVICE WITH AJACENT ELECTRODE-BASEDDETECTION

(71) Applicant: Alps Alpine Co., Ltd., Tokyo (JP)

(72) Inventor: Shunsuke Umemura, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/956,272

(22) Filed: Nov. 22, 2024

(65) Prior Publication Data

US 2025/0085818 A1    Mar. 13, 2025

Related U.S. Application Data

(63) Continuation of application No. PCT/JP2023/007337, filed on Feb. 28, 2023.

(30) Foreign Application Priority Data

Jun. 24, 2022 (JP) .................. 2022-102202

(51) Int. Cl.
  *G06F 3/044* (2006.01)
  *G06F 3/01* (2006.01)
(52) U.S. Cl.
  CPC .............. *G06F 3/044* (2013.01); *G06F 3/016* (2013.01)
(58) Field of Classification Search
  CPC . G06F 3/044; G06F 3/016; G06F 3/01; G06F 3/02; G06F 3/041; G06F 3/0445; G06F 3/0446; H01H 13/00; H01H 36/00; H01H 13/14; H01H 36/004
  See application file for complete search history.

(56) References Cited

U.S. PATENT DOCUMENTS

| 2006/0192690 A1 | 8/2006 | Philipp |
| 2010/0225604 A1* | 9/2010 | Homma .................. G06F 3/044 345/173 |
| 2015/0123941 A1* | 5/2015 | Fujioka .................. G06F 3/044 345/174 |
| 2019/0265072 A1 | 8/2019 | Wada et al. |

FOREIGN PATENT DOCUMENTS

| JP | 2009-521035 A | 5/2009 |
| JP | 2009-239649 A | 10/2009 |
| JP | 2011-258456 A | 12/2011 |
| JP | 2015-076386 A | 4/2015 |
| WO | 2018-088144 A1 | 5/2018 |

* cited by examiner

*Primary Examiner* — David D Davis
(74) *Attorney, Agent, or Firm* — Harness, Dickey & Pierce, P.L.C.

(57) ABSTRACT

An input device includes electrodes, a detection section configured to detect capacitance values of the electrodes, and a determination section configured to determine whether an operation input has been performed by an operation body to an operation area of operation areas based on the capacitance values. The electrodes correspond to the operation areas and are disposed adjacent to each other on the back sides of the operation areas. The determination section determines whether the operation input has been performed on the operation area corresponding to one electrode of the electrodes based on a difference value obtained by subtracting a value obtained by multiplying capacitance values of electrodes adjacent to one electrode by a coefficient k, k being 0<k<1, from the capacitance value of one electrode.

10 Claims, 8 Drawing Sheets

CAPACITIVE INPUT DEVICE WITH AJACENT ELECTRODE-BASEDDETECTION

CLAIM OF PRIORITY

This application is a Continuation of International Application No. PCT/JP2023/007337 filed on Feb. 28, 2023, which claims benefit of Japanese Patent Application No. 2022-102202 filed on Jun. 24, 2022. The entire contents of each application noted above are hereby incorporated by reference.

BACKGROUND OF THE INVENTION

1. Field of the Invention

The present disclosure relates to an input device.

2. Description of the Related Art

A known touch switch includes an operation surface having a plurality of operation areas, a plurality of detection means for detecting a change in physical quantity caused by the approach of an object (operation body) to the operation surface and for outputting an output value corresponding to the amount of change in the physical quantity, and a determination means for determining an operation area of the operation target based on the output values from the plurality of detection means. Even if a first output value of a first detection means corresponding to a first operation area among the plurality of detection means is equal to or greater than a predetermined reference value, if an output ratio of the output value of the detection means corresponding to the other operation areas to the first output value is equal to or greater than a predetermined reference ratio, the determination means determines that the first operation area is not the operation target. This detection means is an electrode of a capacitive sensor, and the physical quantity is a capacitance (capacitance value) (for example, see Japanese Unexamined Patent Application Publication No. 2011-258456).

The capacitance values detected at an electrode are different when a fingertip touches the operation surface and when a palm touches the operation surface, even if the distances from the fingertip and the palm to the electrode are equal. This is because the areas (sizes) of the operation bodies with respect to the electrode are different. In addition, the capacitance values are different depending on the distances between the operation bodies and the electrode.

Known touch switches do not cover such capacitance value differences caused by the differences in size of the operation bodies. Accordingly, it is unsure whether the increase in a capacitance value is caused by a large operation body that is away from the operation surface or by an operation body approaching the operation surface, and thus these touch switches may erroneously determine what kind of operation input is being performed.

To solve the problem, the present disclosure provides an input device configured to correctly determine an operation input being performed by an operation body on an operation target, regardless of the size of the operation body.

SUMMARY OF THE INVENTION

An input device according to an embodiment of the disclosure includes a plurality of electrodes corresponding to a plurality of operation areas disposed adjacent to each other, the electrodes being disposed on back sides of the plurality of operation areas, a detection section configured to detect capacitance values of the plurality of electrodes, and a determination section configured to determine whether an operation input has been performed by an operation body to any operation area of the plurality of operation areas based on the plurality of capacitance values detected by the detection section. Based on a difference value obtained by subtracting, from the capacitance value of one electrode of the plurality of electrodes, a value obtained by multiplying capacitance values of electrodes adjacent to the one electrode by a coefficient k, k being $0<k<1$, the determination section determines whether the operation input has been performed by the operation body on the operation area corresponding to the one electrode.

DESCRIPTION OF THE PREFERRED EMBODIMENTS

Hereinafter, an embodiment of an input device according to the disclosure will be described.

In the following description, an XYZ coordinate system is defined and described. For the sake of convenience, a $-Z$ direction side denotes a lower side or bottom, and a $+Z$ direction side denotes an upper side or top. However, this does not represent a universal vertical relationship. Viewing an XY plane is referred to as a view in plan view.

Embodiment

Structure of Input Device 100

Figure 1A:
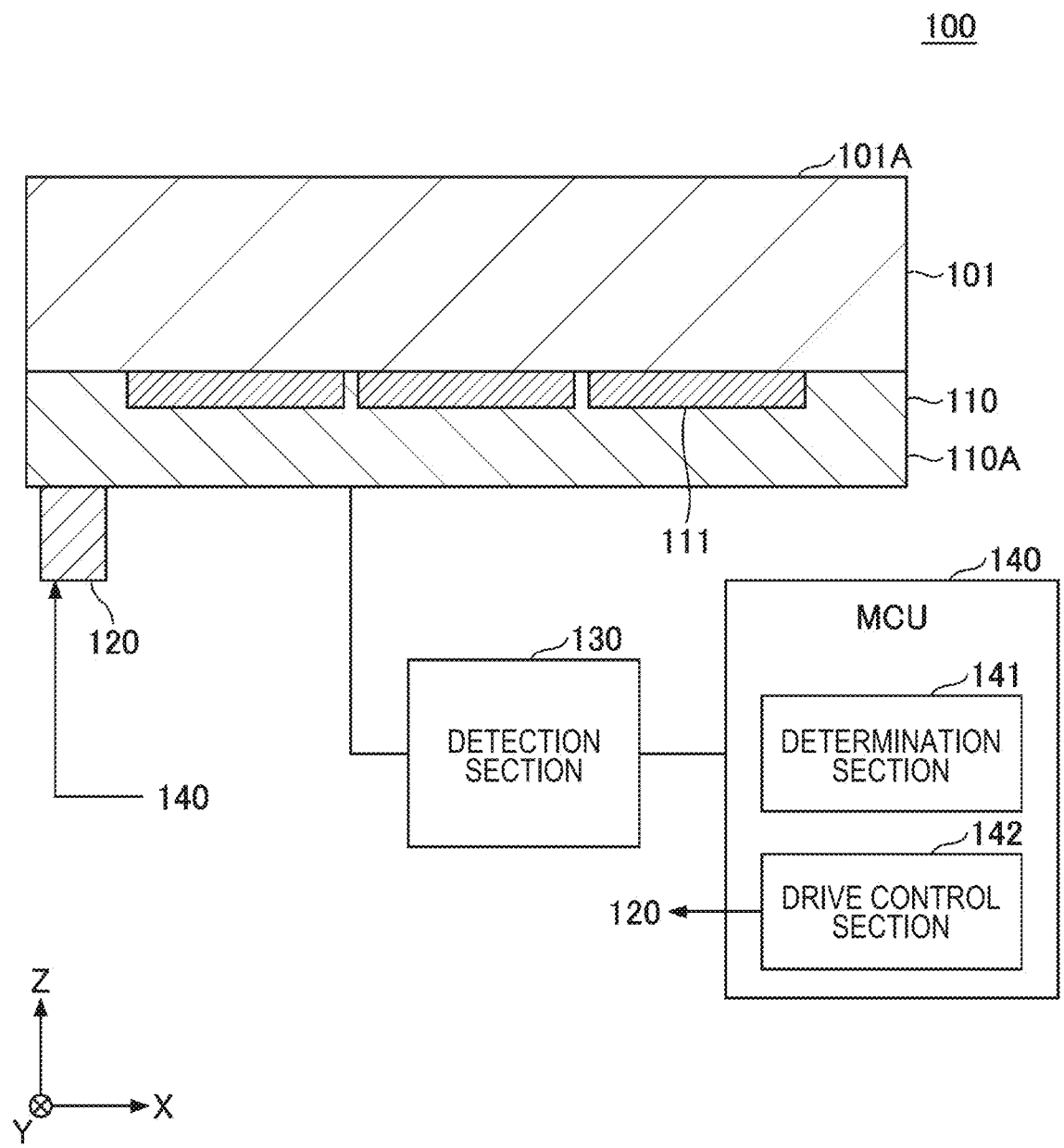
FIG. 1A is a cross-sectional view illustrating a structure of an input device 100 according to an embodiment.
Figure 1B:
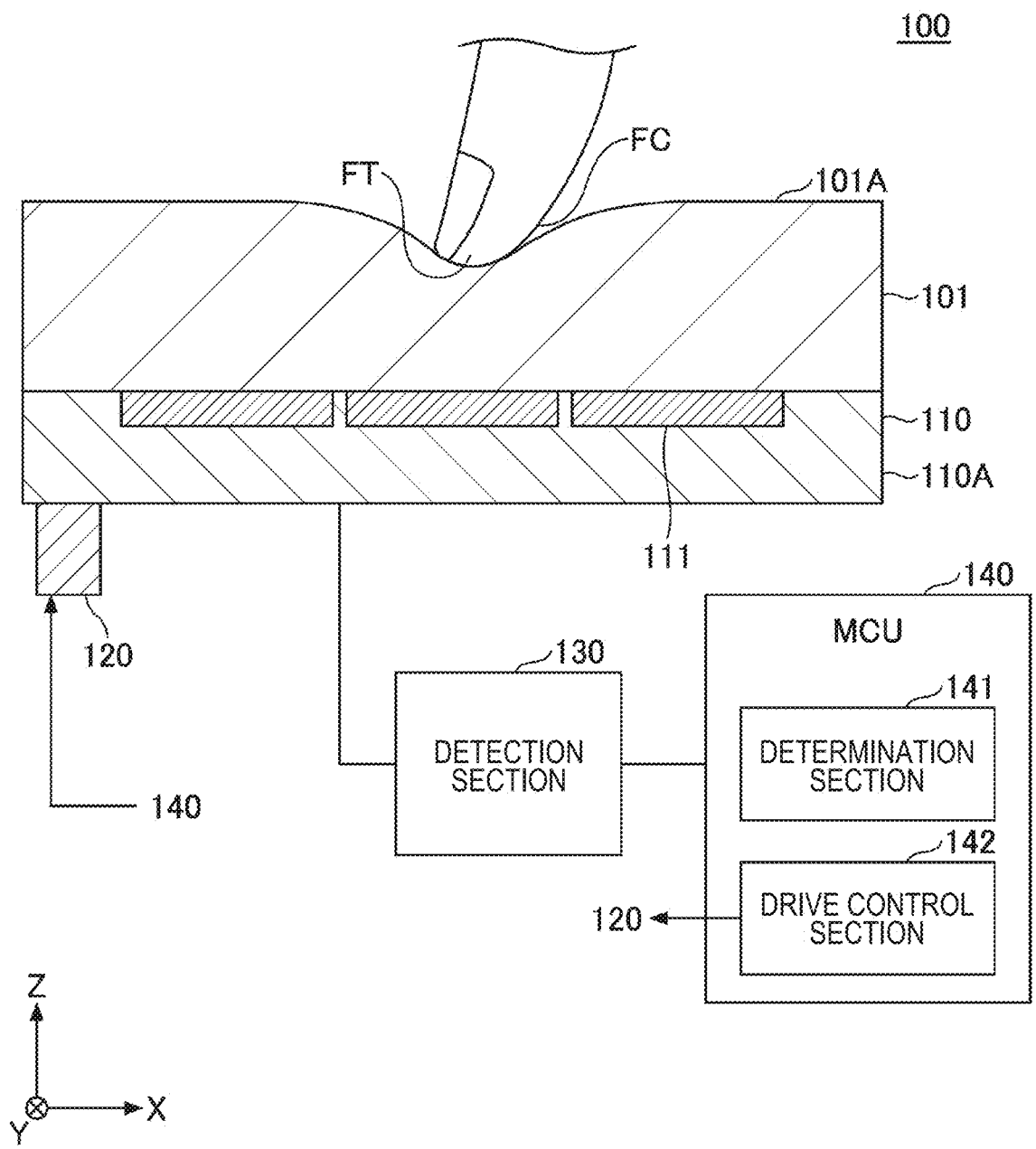
FIG. 1B is a cross-sectional view illustrating the input device 100 according to the embodiment in an operating state.

FIG. 1A is a cross-sectional view illustrating a structure of an input device 100 according to the embodiment. FIG. 1B is a cross-sectional view illustrating the input device 100 according to the embodiment in an operating state. The input device 100 includes a soft pad 101, an electrostatic sensor 110, an actuator 120, a detection section 130, and a micro controller unit (MCU) 140. The soft pad 101 is an example covering section made of a foam material, and the actuator 120 is an example vibration element.

The soft pad 101 is disposed on the electrostatic sensor 110 to cover an upper surface of the electrostatic sensor 110. The soft pad 101 is made of a foam material, such as a urethane foam, a foam sponge, or a foam rubber, and is a cover that is deformed elastically when depressed.

The top surface of the soft pad 101 is an operation surface 101A and on which symbols corresponding to electrodes 111 of the electrostatic sensor 110 are displayed respectively. The symbols are respectively provided to corresponding operation sections of the operation surface 101A. These symbols include, for example, characters, numbers, signs, diagrams, and marks that have specific meanings, and here, these symbols represent functions, types, and the like of the plurality of operation sections of the input device 100. It should be noted that the operation surface may be formed on the top surface of the soft pad 101 with a decoration sheet having a plurality of symbols.

The soft pad 101 is a member used when the user performs an operation input on the input device 100 by bringing a hand or other part close to an operation area where a symbol is displayed and pressing the operation surface 101A downward as illustrated in FIG. 1B. The input device 100 is an input device that is used to confirm an operation input in response to such a depressing operation with a hand or other part on the operation area.

The electrostatic sensor 110 is provided on a back side (−Z direction side) of the soft pad 101. The electrostatic sensor 110 includes the substrate 110A and the plurality of electrodes 111. The plurality of electrodes 111 may be made of a conductive material, and may be made of a transparent electrode material such as Indium Tin Oxide (ITO) when the electrodes 111 are to be transparent, or may be made of metal foil such as copper foil or aluminum foil when it is not necessarily required that the electrodes 111 be transparent. When the electrodes 111 are to be partially transparent, a part made of a transparent electrode material and a part made of metal foil may be provided.

These electrodes 111 are provided to be adjacent to each other. Here, as an example, a structure in which three electrodes 111 are arrayed in the X direction is illustrated; however, the plurality of electrodes 111 may be arrayed in a matrix state in the X direction and the Y direction. The plurality of electrodes 111 may be provided in a planar array along the X direction or the Y direction, or along the X direction and the Y direction, and as an example, positions in the Z direction are equal.

The plurality of electrodes 111 is connected to a detection section 130 via lines on the substrate 110A. The capacitance between the plurality of electrodes 111 and an operation body, such as a fingertip FT, is detected by the detection section 130.

The actuator 120 is a vibration element that can transmit vibration of the soft pad 101, and as an example, provided on a bottom surface of the substrate 110A. The actuator 120 is connected to the MCU 140 and is driven by a drive control section 142 of the MCU 140.

The actuator 120 is used to transmit vibration to the soft pad 101, and thus the location of the actuator 120 is not limited to the bottom surface of the substrate 110A and may be disposed on a top surface or other portions of the substrate 110A, on the soft pad 101, on a housing (not illustrated) for holding the soft pad 101, or the like. The actuator 120 is, as an example, driven by the MCU 140 and provides vibration to the user when the user confirms an operation input to the input device 100.

The detection section 130 detects capacitance values (capacitance) that represent capacitance of the plurality of electrodes 111 in the electrostatic sensor 110, converts the capacitance values into digital values, and outputs the values to the MCU 140. Such a detection section 130 can be implemented, as an example, by an integrated circuit (IC) including an analog-to-digital (A/D) converter.

The MCU 140 is connected to the detection section 130. The MCU 140 is implemented by a computer including a central processing unit (CPU), a random access memory (RAM), a read-only memory (ROM), an input-output interface, an internal bus, and the like.

The MCU 140 includes the determination section 141 and the drive control section 142. The determination section 141 and the drive control section 142 represent functions of programs performed by the MCU 140 as function blocks.

The determination section 141 determines whether an operation input has been performed by an operation body on the plurality of electrodes 111 based on capacitance values of the plurality of electrodes 111 detected by the detection section 130. The determination process performed by the determination section 141 is described in detail below.

When the determination section 141 determines that an operation input has been performed by an operation body, the drive control section 142 drives the actuator 120. In this description, as an example, the drive control section 142 drives the actuator 120 in response to a confirmation of an operation input to the input device 100 by the user and provides vibration to the user.

Operation of Input Device 100

As illustrated in FIG. 1B, the input device 100 can operate any of the plurality of electrodes 111 of the electrostatic sensor 110 when the operation surface 101A of the soft pad 101 is depressed. When the user presses down the operation surface 101A of the soft pad 101 with a fingertip FT, the capacitance value (capacitance) between the fingertip FT and the electrode 111 changes. Based on the change in the capacitance value, the determination section 141 determines whether an operation has been performed, and thereby determining that any of the electrodes 111 has been operated. In FIG. 1B, reference character FC denotes a position of a finger cushion, and hereinafter, it is referred to as a finger cushion FC.

When the determination section 141 determines that an operation input has been performed, the drive control section 142 drives the actuator 120, enabling the user to feel vibration at a fingertip FT, a palm, or other part and recognize with a tactile sense that the user's operation input has been confirmed. Accordingly, the input device 100 can be used as, as an example, a switch that can be operated by touch typing.

Detailed Structure of Electrostatic Sensor 110

Figure 2:
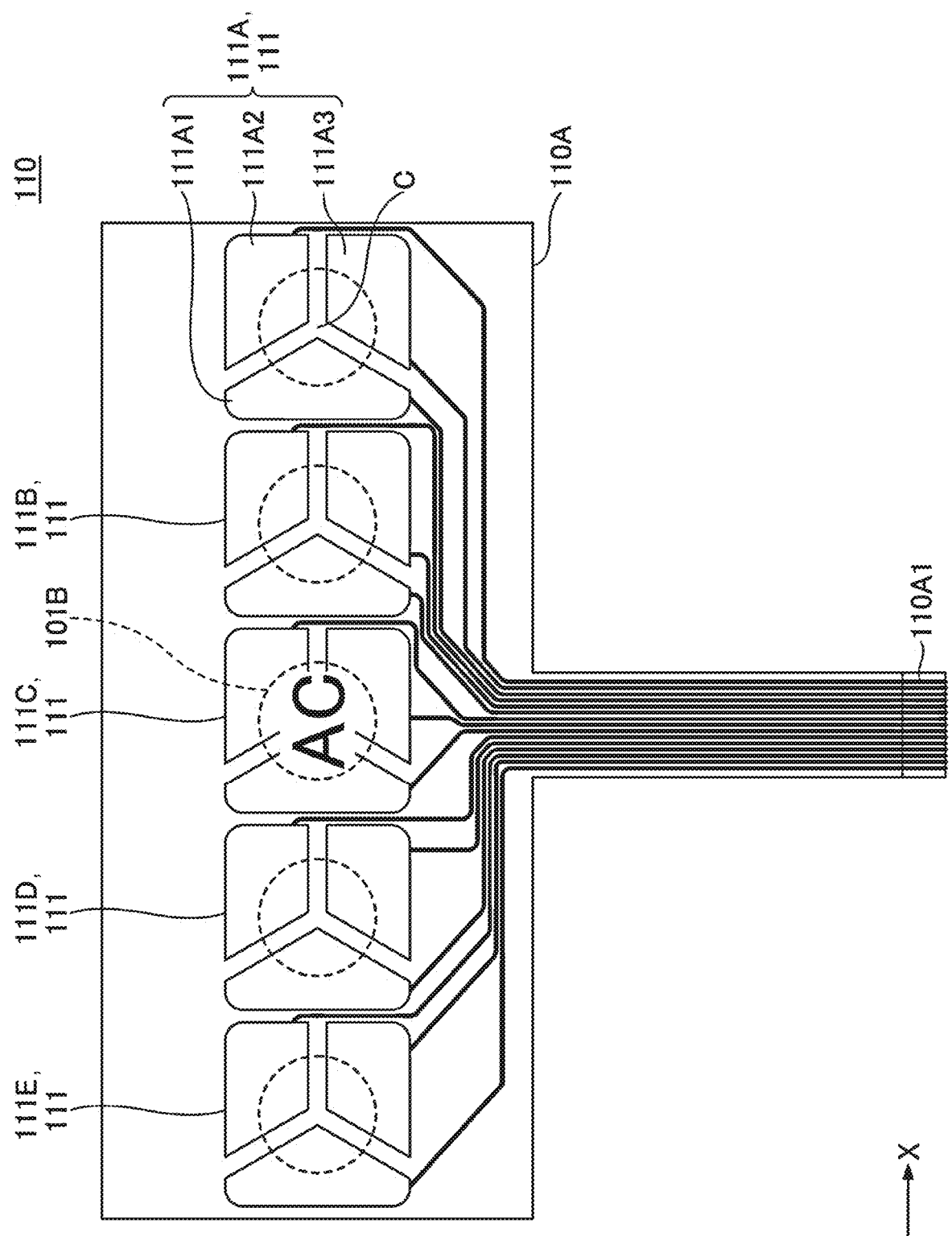
FIG. 2 illustrates a structure of an electrostatic sensor 110.

FIG. 2 illustrates a structure of the electrostatic sensor 110. The electrostatic sensor 110 includes, as an example, five electrodes 111 (111A to 111E) provided on an upper surface of the T-shaped substrate 110A. These five electrodes 111 are referred to as electrodes 111A to 111E when each of the electrodes is distinguished, and simply referred to as electrodes 111 when it is not necessary to distinguish these electrodes.

The electrode 111A that is on the most +X direction side of the five electrodes 111 has three electrode pieces 111A1, 111A2, and 111A3. This applies also to the electrodes 111B to 111E; however, in FIG. 2, the reference numerals 111A1, 111A2, and 111A3 are given to the three electrode pieces only for the electrode 111A. The structures of the electrodes 111A to 111E are similar, and thus, here, the electrode pieces 111A1, 111A2, and 111A3 of the electrode 111A are described.

The electrode pieces 111A1, 111A2, and 111A3 are three electrode pieces that can be obtained by radially dividing the electrode 111A with respect to a center C of the electrode 111A that is substantially square as a whole in plan view. The electrode piece 111A1 is disposed on the −X direction side with respect to the center C and the electrode pieces 111A1, 111A2, and 111A3 are disposed clockwise. Each of the electrode pieces 111A1, 111A2, and 111A3 is an electrode piece of a fan shape extending at 120 degrees with respect to the center C. The electrode pieces 111A1 to 111A3 are connected to a connector 110A1 via three lines. The connector 110A1 is connected to the detection section 130.

In FIG. 2, operation areas 101B are illustrated using the broken lines at central portions of the electrodes 111A to 111E. FIG. 2 illustrates positions of five operation areas 101B displayed on the operation surface 101A of the soft pad 101 using broken lines in central portions of the electrodes 111A to 111E. The operation area 101B is an operation target onto which an operation body performs an operation input, and indicates an area within which a symbol is provided.

On the operation surface 101A of the soft pad 101, symbols are displayed in the five operation areas 101B. These symbols include, for example, characters, numbers, signs, diagrams, marks, and the like that have specific meanings, and here, these symbols represent functions, types, and the like of the plurality of operation sections of the input device 100.

In FIG. 2, as an example, characters "AC" are provided in the operation area 101B superimposed and displayed on the electrode 111C. AC stands for air conditioner. The operation area 101B superimposed and displayed on the electrode 111C is an operation area for an air conditioner (AC). Symbols other than "AC" are displayed in the four operation areas 101B superimposed and displayed on the electrodes 111A, 111B, 111D, and 111E; however, these symbols are omitted in FIG. 2.

Each symbol can be displayed in each operation area 101B as follows. For example, a portion of each electrode 111 overlapping with the operation area 101B may be made of a transparent electrode material and a portion not overlapping with the operation area 101B may be made of metal foil or the like that is not transparent. A translucent portion or a light shielding portion corresponding to the shape of the symbol may be provided to the soft pad 101, and light may be emitted from a light source provided on the −Z direction side of the electrostatic sensor 110 to display the symbols in the respective operation areas 101B. Alternatively, symbols may be displayed by printing or other methods on the operation areas 101B (the surface of the operation surface 101A).

The electrode 111 is larger than the corresponding operation area 101B and includes the corresponding operation area 101B in plan view. The sizes of the electrodes 111 and the corresponding operation areas 101B and the positional relationship are set as described above for the following reasons.

When the input device 100 according to the disclosure is used as an input device for a vehicle, the input determination can be performed even when a peripheral portion of the operation area 101B is depressed and thus the driver can perform the input without looking at the driver's hand.

When the user performs an operation input on the operation surface 101A of the soft pad 101, the user may perform the input with a fingertip FT, a finger cushion FC, or a palm. The operation performed with a fingertip FT is an operation of depressing the soft pad 101 with the tip of the finger in a state in which the fingertip FT points to the operation surface 101A as illustrated in FIG. 1B. An area of contact in the operation surface 101A in an operation performed with a finger cushion FC is larger than that in the operation performed with the fingertip FT in plan view. An area of contact in the operation surface 101A in an operation performed with a palm is even larger than that in the operation performed with the fingertip FT or the finger cushion FC in plan view.

As described above, when an operation input is performed with the fingertip FT, the finger cushion FC, or the palm, the areas of contact in the operation surface 101A differ from each other in plan view. Accordingly, even if the distances in the Z direction between each electrode 111 and the operation bodies (the fingertip FT, the finger cushion FC, the palm, or the like) are the same, capacitances between each electrode 111 and the operation bodies (the fingertip FT, the finger cushion FC, the palm, or the like) are different from each other. This is because the areas of the operation bodies that capacitively coupled to each electrode 111 differ from each other. These differences become apparent when the area of the electrode is greater than or equal to the area of the fingertip FT. More specifically, when the area of the electrode is sufficiently small compared to the area of the fingertip FT, the differences in capacitance values in the case of the fingertip FT, the finger, or the palm are only due to components of the surrounding electric field, and the differences are not significant. On the other hand, when the area of the electrode is greater than or equal to the area of the fingertip FT, the area of the parallel electric field changes and the difference in capacitance values become large, and in such a case, an incorrect determination that an operation input has been performed may be made.

Even if operation inputs are performed by various operation bodies, such as the finger cushion FC, the palm having a large area, or the like, on an electrode having a large area, the input device 100 can correctly detect the positions of the operation bodies in the Z direction and correctly determine the operation inputs performed by the operation bodies on the operation areas 101B, which are the operation targets, regardless of the sizes of the operation bodies. To implement this, values are corrected using an algorithm B described below.

Algorithms in Input Device 100

The input device 100, by using the electrodes 111 illustrated in FIG. 2, uses algorithms described below to correctly determine whether a depressing operation has been performed when an operation input is performed by an operation body that may have various areas. Description will be made with reference to FIGS. 3A to 5B.

Algorithm A

Figure 3A:
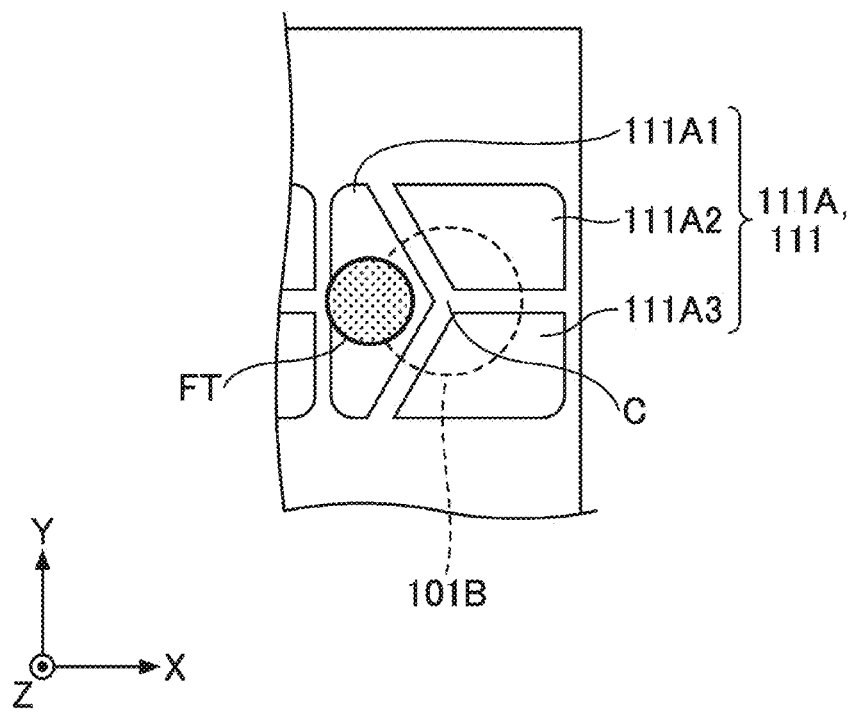
FIG. 3A illustrates differences in capacitance values of electrode pieces 111A1 to 111A3 of an electrode 111A.
Figure 3B:
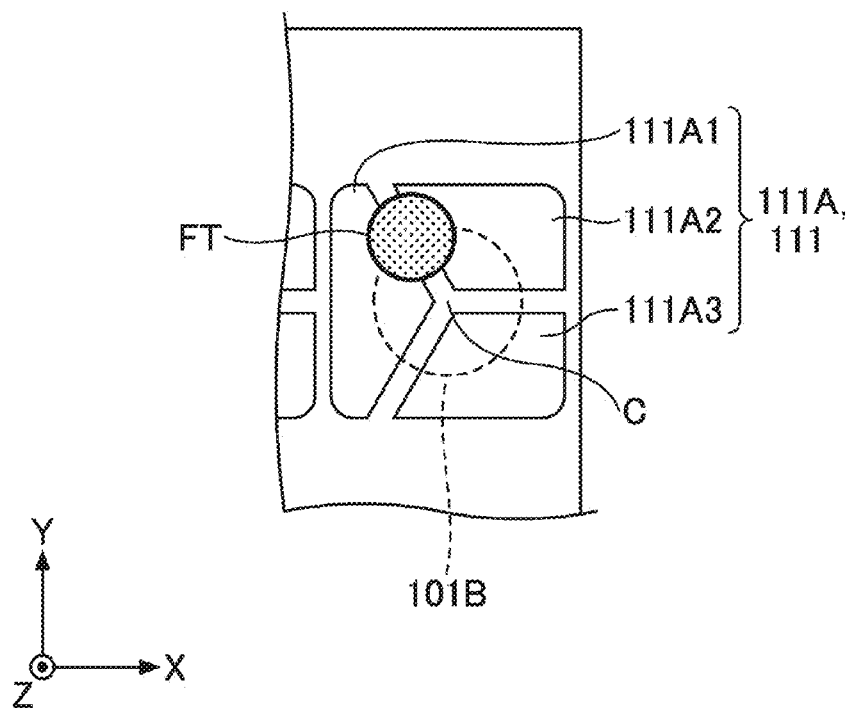
FIG. 3B illustrates differences in capacitance values of the electrode pieces 111A1 to 111A3 of the electrode 111A.

Here, with reference to FIG. 3A and FIG. 3B, a determination process performed by the determination section 141 using the algorithm A is described. FIG. 3A and FIG. 3B illustrate differences in capacitance values of the electrode pieces 111A1 to 111A3 of the electrode 111A. It is assumed that the algorithm A described with reference to FIG. 3A and FIG. 3B is used when an area of an operation body in plan view is relatively small. As an example, a case in which an operation input is performed with a fingertip FT on the electrode 111A is described. In FIG. 3A and FIG. 3B, circles denote positions of a fingertip FT. It should be noted that although the electrode 111A is described here, the electrodes 111B to 111E are similar and thus their descriptions are omitted.

In FIG. 3A, the fingertip FT is performing an operation input on the electrode 111A and is within the area of the electrode piece 111A1. In such a case, based on the capacitance value of the electrode piece 111A1, whether the operation input has been performed on the electrode piece 111A can be detected.

In FIG. 3B, the fingertip FT is performing an operation input on the electrode 111A; however, the fingertip FT is overlapping with the electrode piece 111A1 and the electrode piece 111A2 but not overlapping with the electrode piece 111A3. In such a case, the capacitance values of the electrode pieces 111A1 to 111A3 are smaller than the capacitance value of the electrode piece 111A1 in FIG. 3A, and thus whether the operation input has been performed on the electrode 111 cannot be detected by the same determination method as in FIG. 3A.

Here, a threshold value TH1 is used such that when a depressing operation is performed on the electrode piece 111A1 as illustrated in FIG. 3A, the capacitance value of the electrode piece 111A1 is greater than or equal to the threshold value TH1. The depressing operation is an example operation input. The threshold value TH1 is an example first threshold value. The use of the threshold value TH1 enables the determination of whether a depressing operation has been performed on any of the electrode pieces 111A1 to 111A3. Accordingly, when any of capacitance values CA1 to CA3 of the electrode pieces 111A1 to 111A3 is greater than or equal to the threshold value TH1, the determination section 141 may determine that an operation input with a fingertip FT has been performed on the electrode 111A.

In the case of FIG. 3B, all capacitance values of the electrode pieces 111A1 to 111A3 are not greater than or equal to the threshold value TH1. In such a case, the determination section 141 may calculate three total values: a total value (CA1+CA2) of adjacent electrode pieces 111A1 and 111A2, a total value (CA2+CA3) of adjacent electrode pieces 111A2 and 111A3, and a total value (CA3+CA1) of adjacent electrode pieces 111A3 and 111A1. If any of these total values is greater than or equal to a threshold value TH2, the determination section 141 may determine that an operation input by a fingertip FT has been performed on the electrode 111A. This threshold value TH2 is greater than the threshold value TH1, and as an example, the threshold value TH2 may be set to a value approximately 1.4 to 2 times greater than the threshold value TH1.

It should be noted that the algorithm A is primarily designed for cases in which the area of an operation body is quite small, and the algorithm A can be used additionally when a correction by an algorithm B described below is not sufficient to obtain desired operational characteristics, and it is not necessarily required.

Algorithm B

Figure 4A:
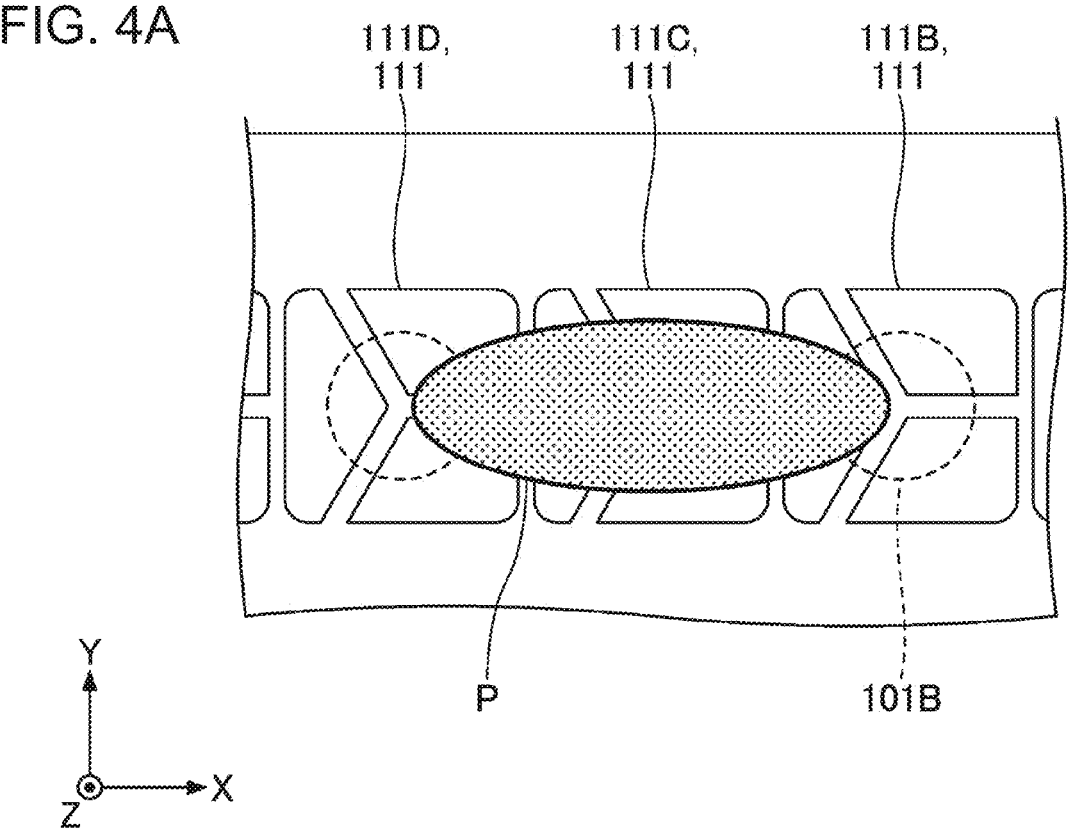
FIG. 4A illustrates differences in capacitance values of electrodes 111B to 111D.
Figure 4B:
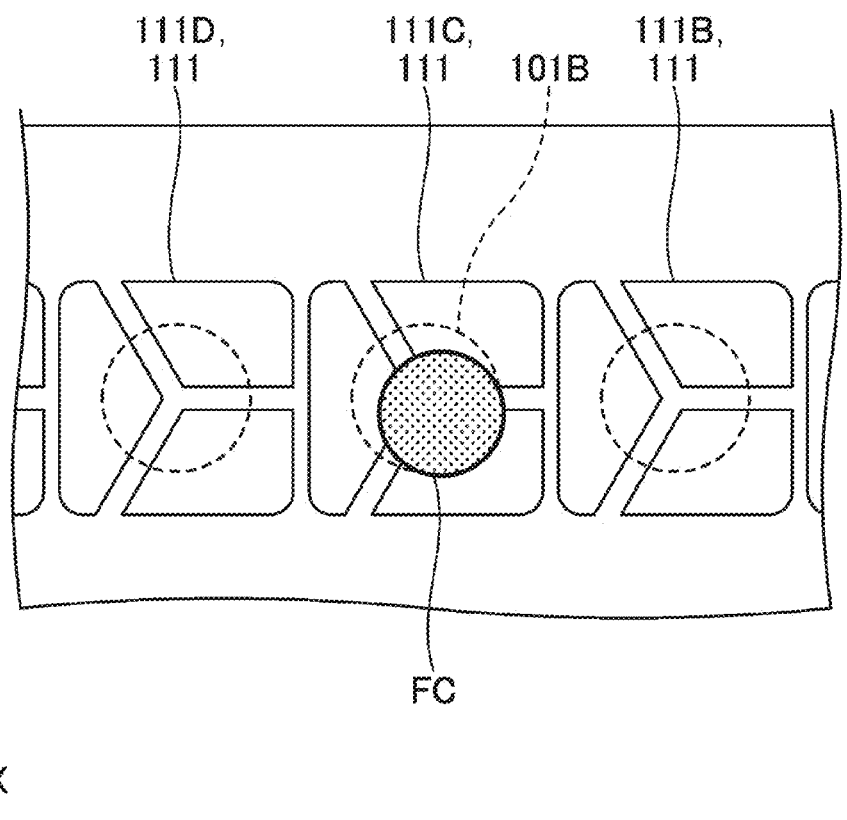
FIG. 4B illustrates differences in capacitance values of the electrodes 111B to 111D.

Here, with reference to FIG. 4A and FIG. 4B, a determination process performed by the determination section 141 using the algorithm B is described. FIG. 4A and FIG. 4B illustrate differences in capacitance values of the electrodes 111B to 111D. FIG. 4A illustrates a state in which a depressing operation is being performed with a palm P overlapping with and covering the electrodes 111B to 111D. In FIG. 4A, it is assumed that the user is performing the depressing operation with the palm P on the operation area 101B for a symbol corresponding to the electrode 111C. FIG. 4B illustrates a state in which the depressing operation is being performed with a finger cushion FC on only the electrode 111C. It is assumed that the position of the palm P in FIG. 4A and the position of the finger cushion FC in FIG. 4B are equal in the Z direction.

In FIG. 4A, the depressing operation is being performed with the palm P overlapping with and covering the electrodes 111B to 111D, and the capacitance values of the electrodes 111B to 111D change compared to a state in which no operation input is performed. In FIG. 4B, the depressing operation is being performed with the finger cushion FC only on the electrode 111C, and thus the capacitance value of the electrode 111C changes.

As in such cases, when depressing operations are performed by operation bodies having different areas, such as the palm P or the finger cushion FC, in order to perform the determination on both depressing operations by using the same threshold value TH3, the determination section 141 performs the following determination process. The threshold value TH3 is an example second threshold value. The input device 100 corrects values by using the algorithm B to enable the determination on both depressing operations by using the same threshold value TH3 when depressing operations are performed by operation bodies having different areas, such as the palm P or the finger cushion FC. The threshold value TH3 is greater than the threshold value TH2, and as an example, the threshold value TH3 may be set to a value approximately 1.7 to 2.5 times greater than the threshold value TH1.

The determination section 141 performs the following process when determining whether an operation input has been performed on the electrode 111C. The determination section 141 calculates three total values: a total value Ctc of capacitance values of three electrode pieces of the electrode 111C, a total value Ctb of capacitance values of three electrode pieces of the electrode 111B adjacent to the electrode 111C, and a total value Ctd of capacitance values of three electrode pieces of the electrode 111D adjacent to the electrode 111C. Then, the determination section 141 can determine whether an operation input has been performed on the electrode 111C by determining whether a corrected capacitance value CC that is corrected by using the following equation (1) is greater than or equal to the threshold value TH3. The coefficient k is 0<k<1.

$$CC = Ctc - k(Ctb + Ctd) \qquad (1)$$

The corrected capacitance value CC is an example difference value obtained by subtracting, from the capacitance value of the electrode 111C, which is one of the plurality of electrodes 111A to 111E, a value obtained by multiplying the capacitance values Ctb and Ctd of the electrodes 111B and 111D, which are adjacent to the one electrode 111C, by the coefficient k (0<k<0.5, preferably, 0.1≤k≤0.3).

The determination section 141 performs such a determination process on each of the electrodes 111A to 111E. The electrodes 111A and 111E at both ends have one adjacent electrode, and thus the capacitance value of the adjacent one electrode can be multiplied by the coefficient k and the obtained value can be subtracted from the electrode's capacitance value. For example, in the case of the electrode 111A, the determination section 141 can calculate a total value Cta of the three electrode pieces of the electrode 111A and a total value Ctb of the three electrode pieces of the electrode 111B adjacent to the electrode 111A, and can calculate a corrected capacitance value CC by using the following equation (2).

$$CC = Cta - kCtb \qquad (2)$$

Here, without distinguishing the electrodes 111A to 111E, a corrected capacitance value CC for one electrode 111 can be expressed by the following equation (3), where Ct1 is a total value of capacitance values of three electrode pieces of an electrode 111, and Ct2 is a total value of capacitance values of three electrode pieces of one or more electrodes 111 adjacent to the electrode 111. The total value Ct1 is an example first total value, and the total value Ct2 is an example second total value.

$$CC = Ct1 - kCt2 \quad (3)$$

It is not necessary that the coefficient k is the same for all electrodes, and the correction coefficient for the electrodes 111A and 111E may be, considering that the number of adjacent electrodes is one, twice the value of the correction coefficient for the electrodes 111B to 111D.

When a depressing operation is performed with a palm P on the operation area 101B for a symbol corresponding to the electrode 111C, since the area of the palm P is large, the capacitance value of the electrode 111C increases largely, and in addition, since the area is large, the capacitance values of the adjacent electrodes also increase. On the other hand, when a depressing operation is performed with a finger cushion FC, the area of the finger cushion FC is smaller than that of the palm P and the change in the capacitance value of the electrode 111C is small compared to the case in which the operation is performed with the palm P, but the capacitance values of the adjacent electrodes change very little. Accordingly, as in the equations (1), (2), and (3), by performing correction by calculating differences of the capacitance values of adjacent electrodes, the values are corrected to a value based on the distance from the electrode regardless of the area of the palm P, the area of the finger cushion FC, or the like, and thus, by using the same threshold value, the determination of whether a depressing operation has been performed can be performed.

Algorithm C

Figure 5A:
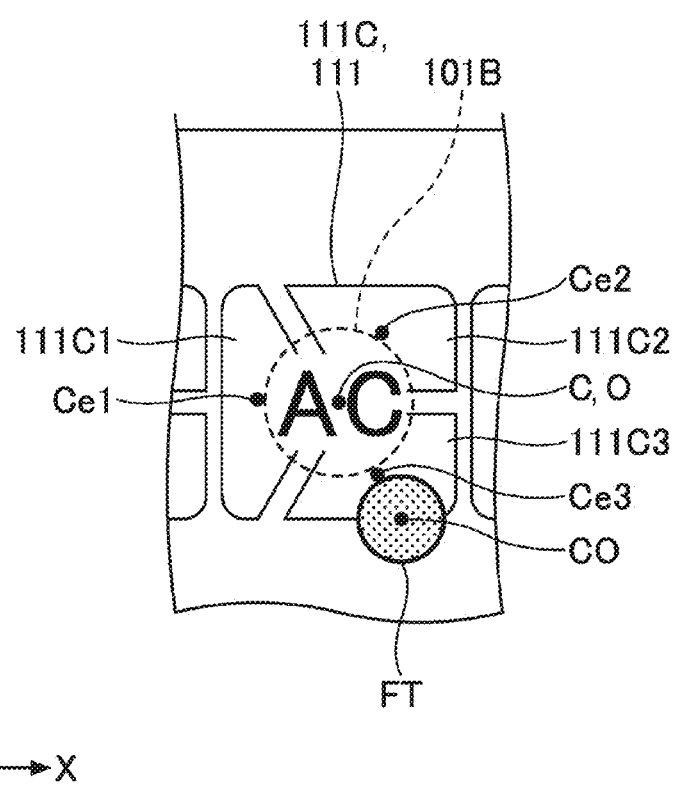
FIG. 5A illustrates a difference in positions of a fingertip FT with respect to an electrode 111C.
Figure 5B:
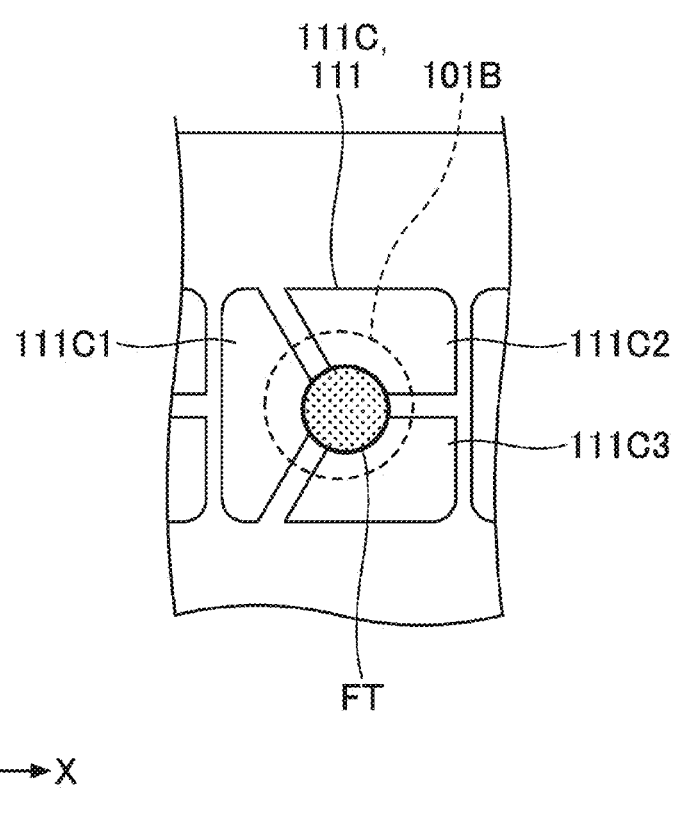
FIG. 5B illustrates a difference in positions of the fingertip FT with respect to the electrode 111C.

Here, a determination process performed by the determination section 141 using the algorithm C is described with reference to FIG. 5A and FIG. 5B. FIG. 5A and FIG. 5B illustrate differences in positions of a fingertip FT with respect to the electrode 111C. FIG. 5A and FIG. 5B illustrate three electrode pieces 111C1 to 111C3 of the electrode 111C.

The size of each electrode 111 is larger than that of the operation area 101B in plan view and this may cause the occurrence of the following states. For example, as illustrated in FIG. 5A, when the fingertip FT is located at an end of the electrode piece 111C3 in plan view, the capacitance value is greater than or equal to the threshold value TH1. As illustrated in FIG. 5B, when the fingertip FT is located at a center of the electrode pieces 111C1 to 111C3 in plan view, the corrected capacitance value CC calculated for the electrode 111C is greater than or equal to the threshold value TH3. In this example illustrated in FIG. 5B, the value of any one of the electrode pieces 111C1 to 111C3 of the electrode 111C does not exceed the threshold value TH1, and the total value of adjacent two electrode pieces does not exceed the threshold value TH2, but the total value of the adjacent electrodes 111B and 111D is approximately zero. Accordingly, the corrected capacitance value CC is approximately equal to the total value of the three electrode pieces 111C1 to 111C3 and is greater than or equal to the threshold value TH3.

In the case of FIG. 5B, since the fingertip FT is located at the center of the electrode pieces 111C1 to 111C3, there is no problem to consider that the user is operating the operation area 101B corresponding to the electrode 111C. On the other hand, in the case of FIG. 5A, the fingertip FT is located at an end of the electrode piece 111C3 and is far off the operation area 101B. This state illustrated in FIG. 5A is caused by the size of each electrode 111 that is larger than the operation area 101B in plan view.

Accordingly, in the algorithm C, when there is an electrode 111 that has a value greater than or equal to the threshold values TH1, TH2, and TH3 in the processing in accordance with the algorithm A or B, the determination section 141 performs the following determination process on the electrode 111.

The determination section 141 may weight positions (centers Ce1, Ce2, and Ce3) of the electrode pieces 111C1 to 111C3 with respect to a position of a center C of the electrode 111C according to capacitance values and calculate a contact center position CO that corresponds to the center of the contact area, and when the distance between the center C and the contact center position CO is less than or equal to a predetermined distance d, determine that an operation input has been performed by the operation body on the operation area 101B corresponding to the electrode 111C. The center C corresponds to the position of the center of gravity of the electrode 111C; however, the center C may be any position to be a reference for determining that an operation has been performed on the operation area 101B, and for example, a point at which the center of the outside shape in the X direction and the center of the outside shape in the Y direction intersect.

The contact center position CO with respect to the electrode pieces 111C1 to 111C3 can be obtained as follows. Assuming that the center C of the electrode pieces 111C1 to 111C3 is the origin O of the XY coordinates, the center Ce1 of the electrode piece 111C1 is located in a direction of 180 degrees to the +X direction, the center Ce2 of the electrode piece 111C2 is located in a direction of +60 degrees to the +X direction, and the center Ce3 of the electrode piece 111C1 is located in a direction of −60 degrees (300 degrees) to the +X direction. These angles are expressed counterclockwise with the +X direction as zero degrees. The centers Ce1, Ce2, and Ce3 correspond to the positions of the center of gravity of the electrode 111C1, the electrode 111C2, and the electrode 111C3 respectively; however, each of the centers Ce1, Ce2, and Ce3 may be any position that corresponds to the center position of each electrode piece, and for example, a point at which the center of an outside shape in the X direction and the center of the outside shape in the Y direction intersect.

It is assumed that distances from the origin O to the centers Ce1, Ce2, and Ce3 are the same and the distance is denoted as k. Accordingly, the component of the X coordinate of the center Ce1 of the electrode piece 111C1 is a value obtained by multiplying COS 180 degrees (=−1) by k, and the component of the Y coordinate is a value obtained by multiplying SIN 180 degrees (=0) by k. The component of the X coordinate of the center Ce2 of the electrode piece 111C2 is a value obtained by multiplying COS 60 degrees (=½) by k, and the component of the Y coordinate is a value obtained by multiplying SIN 60 degrees (=√3/2) by k. The component of the X coordinate of the center Ce3 of the electrode piece 111C3 is a value obtained by multiplying COS 300 degrees $(=\frac{1}{2})$ by k, and the component of the Y coordinate is a value obtained by multiplying SIN 300 degrees $(=-\sqrt{3}/2)$ by k.

Then, an X coordinate Xwc of the contact center position CO obtained by weighting by multiplying the centers Ce1, Ce2, and Ce3 of the electrode pieces 111C1 to 111C3, obtained by the above calculation, with respect to the center C by the capacitance values CA1 to CA3 of the electrode pieces 111C1 to 111C3, can be obtained by the following equation (4).

$$Xwc = k \times \{CA1 \times (-1) + CA2 \times (1/2) + CA3 \times (1/2)\} \quad (4)$$

Similarly, a Y coordinate Ywc of the contact center position CO obtained by weighting by multiplying the centers Ce1, Ce2, and Ce3 of the electrode pieces 111C1 to 111C3 by the capacitance values CA1 to CA3 of the electrode pieces 111C1 to 111C3, can be obtained by the following equation (5).

$$Ywc = k \times \{CA2 \times (\sqrt{3}/2) + CA3(-\sqrt{3}/2)\} \quad (5)$$

By the calculation, the positions of the centers Ce1, Ce2, and Ce3 and the positional relationship of the contact center position CO from the center C can be obtained.

Actually, a constant k is obtained from the shape of the electrodes and simultaneously, a predetermined distance d is set based on the positions of the centers Ce1, Ce2, and Ce3. Then, with the constant k and actually measured capacitance values, a X coordinate Xwc and a Y coordinate Ywc of the contact center position CO are obtained by using the equations (4) and (5), and the square root of the sum of squares is calculated according to a known method to obtain the distance from the center C to the contact center position CO. Then, based on whether the distance from the center C to the contact center position CO is greater than the predetermined distance d, whether the fingertip FT is far off the operation area 101B is determined, and when it is off, it is determined that no operation has been performed on the operation area 101B.

Here, without distinguishing electrodes 111A to 111E, an X coordinate Xw of a contact center position CO obtained by weighting the positions of the three electrode pieces of one electrode 111 according to capacitance values C1 to C3 of respective electrode pieces can be obtained by the following equation (6), which is similar to the equation (4).

$$Xw = k \times \{C1 \times (-1) + C2 \times (1/2) + C3 \times (1/2)\} \quad (6)$$

Without distinguishing electrodes 111A to 111E, a Y coordinate Yw of a contact center position CO obtained by weighting the positions of the three electrode pieces of one electrode 111 according to capacitance values C1 to C3 of respective electrode pieces can be obtained by the following equation (7).

$$Yw = k \times \{\sqrt{(3/2)} + C3 \times (-\sqrt{3}/2)\} \quad (7)$$

In this embodiment, the centers Ce1, Ce2, and Ce3 of the respective electrode pieces 111C1 to 111C3 are obtained with the center C of the electrode 111C as the reference position; however, any position may be used as the reference for calculation.

In addition, since all of the positions of the centers Ce1, Ce2, and Ce3, the predetermined distance d set based on the positions, and the contact center position CO are substantially multiplied by the constant k, the determinations may be performed by using the constant k that is 1. In other words, to determine whether a fingertip FT is far off the operation area 101B, it is not necessary to obtain an absolute value of a distance from a center of an electrode to a contact center. The distance may be obtained as a relative value, such as a predetermined multiple of a numerical value (for example, a distance from a center of an electrode to a center of electrode pieces) based on the size of the electrode, and the distance may be compared to a threshold value.

Flowchart

Figure 6:
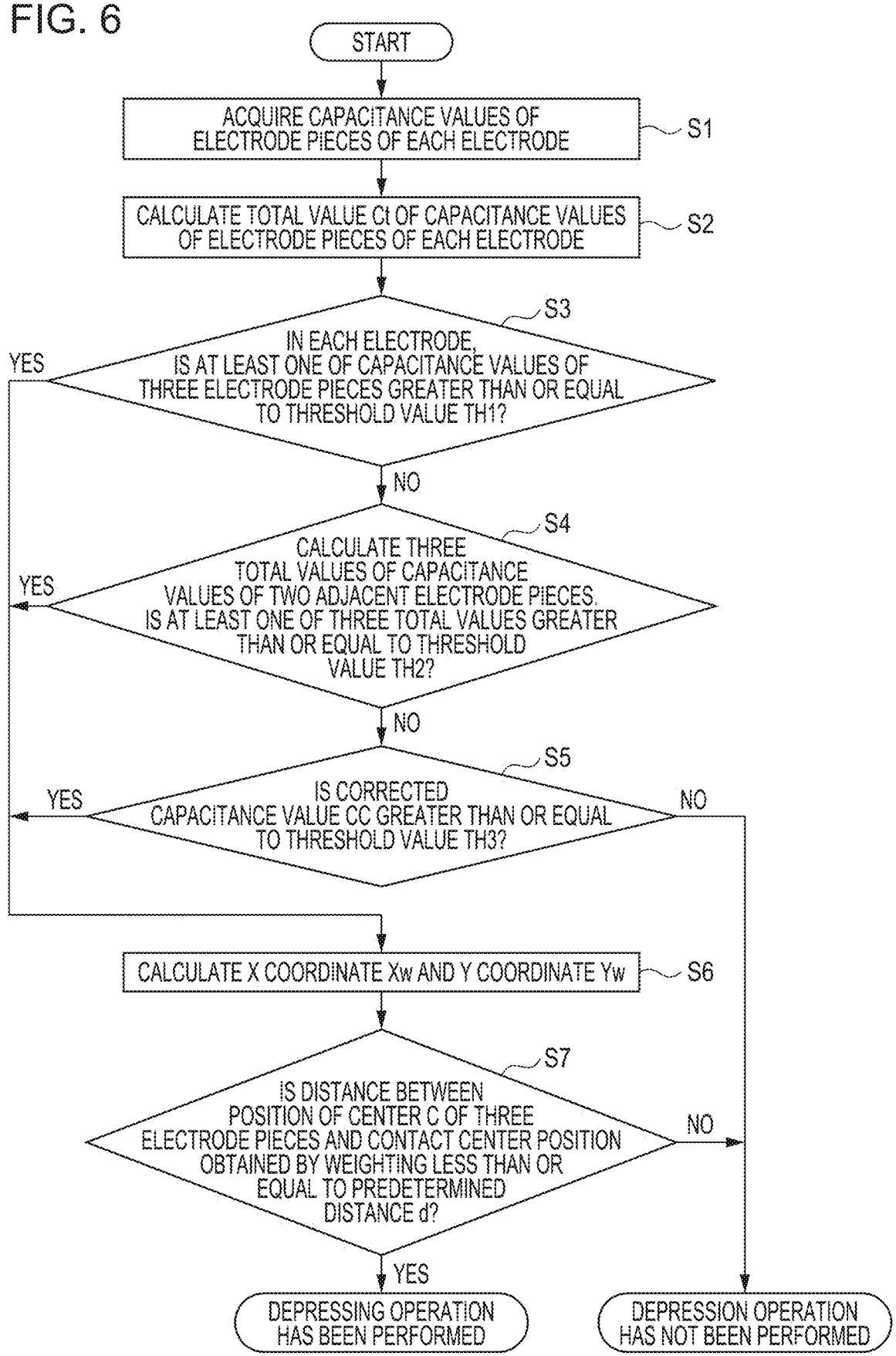
FIG. 6 is a flowchart illustrating processing to be performed by a determination section 141.

FIG. 6 is a flowchart illustrating a process to be performed by the determination section 141. In response to the start of a process, the determination section 141 performs the following process.

The determination section 141 acquires capacitance values of three electrode pieces of each electrode 111 from the detection section 130 (step S1).

The determination section 141 calculates a total value Ct of the capacitance values of the three electrode pieces of each electrode 111 (step S2).

The determination section 141 determines, for each electrode 111, whether at least one of the capacitance values of the three electrode pieces is greater than or equal to the threshold value TH1 (step S3).

For the electrode 111 determined that at least one of the capacitance values of the three electrode pieces is greater than or equal to the threshold value TH1 (S3: YES), the determination section 141 performs a process in step S6 described below.

For the electrode 111 that is determined that none of the capacitance values of the three electrode pieces is greater than or equal to the threshold value TH1 (S3: NO), the determination section 141 calculates three total values of the capacitance values of two adjacent electrode pieces, and determines whether at least one of the three total values is greater than or equal to the threshold value TH2 (step S4). For example, the determination section 141 calculates three total values: a total value (CA1+CA2) of adjacent electrode pieces 111A1 and 111A2, a total value (CA2+CA3) of adjacent electrode pieces 111A2 and 111A3, and a total value (CA3+CA1) of adjacent electrode pieces 111A3 and 111A1. Then, the determination section 141 determines whether any of these total values is greater than or equal to the threshold value TH2. The determination section 141 performs the process in step S4 for each electrode 111. These step S3 and step S4 correspond to the above-described algorithm A.

For the electrode 111 that is determined that at least one of the three total values is greater than or equal to the threshold value TH2 (S4: YES), the determination section 141 performs a process in step S6 described below.

For the electrode 111 that is determined that none of the three total values is greater than or equal to the threshold value TH2 (S4: NO), the determination section 141 reads the total value Ct1 of the capacitance values of the three electrode pieces calculated in step S2 and the total value Ct2 of the capacitance values of the three electrode pieces of one or more electrodes 111 adjacent to the electrode 111 from the RAM in the MCU 140, and determines whether a corrected capacitance value CC calculated in accordance with the equation (3) is greater than or equal to the threshold value TH3 (step S5). This step S5 corresponds to the above-described algorithm B.

When the determination section 141 determines that the corrected capacitance value CC is greater than or equal to the threshold value TH3 (S5: YES), the determination section 141 performs a process in step S6 for the electrode 111.

The determination section 141 calculates an X coordinate Xw and a Y coordinate Yw in accordance with the equation (6) and the equation (7) (step S6). The X coordinate Xw is an X coordinate of a contact center position obtained by weighting the positions of the three electrode pieces of the electrode 111 according to the values of the capacitance values C1 to C3, and the Y coordinate Yw is a Y coordinate of a contact center position obtained by weighting the positions of the three electrode pieces of the electrode 111 according to the values of the capacitance values C1 to C3.

For the electrode 111 processed in step S6, the determination section 141 determines whether a distance between the position of the center C of the three electrode pieces and the contact center position obtained by weighting the positions of the three electrode pieces according to the capacitance values is less than or equal to a predetermined distance d (step S7).

When the determination section 141 determines that the distance calculated for the electrode 111 processed in step S6 is less than or equal to the predetermined distance d (S7: YES), the determination section 141 determines that the depressing operation has been performed on the operation area 101B corresponding to the electrode 111 processed in step S6. Then, vibration is provided to the input device 100, and a predetermined control process that is to be performed in response to the depressing operation on the symbol is performed on a vehicle or the like to which the input device 100 is mounted.

When the determination section 141 determines that the calculated distance is not less than or equal to the predetermined distance d (S7: NO), the determination section 141 determines that the depressing operation has not been performed on the operation area 101B corresponding to the electrode 111 processed in step S6.

In step S5, when the determination section 141 determines that the corrected capacitance value CC is not less than or equal to the threshold value TH3 (S5: NO), the determination section 141 determines that the depressing operation has not been performed on the operation area 101B corresponding to the electrode 111 that is the determination target in step S5.

By this process, the processing illustrated in FIG. 6 ends. The determination section 141 repeatedly performs the processing illustrated in FIG. 6 in a predetermined control cycle.

As described above, the determination section 141 obtains a total value Ct1 of capacitance values of three electrode pieces of an electrode 111 and a total value Ct2 of capacitance values of three electrode pieces of one or more electrodes 111 adjacent to the electrode 111, and determines whether a corrected capacitance value CC, which is a difference value obtained by subtracting a value obtained by multiplying the total value Ct2 by a coefficient k from the total value Ct1, is greater than or equal to the threshold value TH3 to determine, for the electrode 111C, whether the operation input has been performed (algorithm B, step S5).

Accordingly, the input device 100 configured to correctly determine an operation input being performed by an operation body on an operation target, regardless of the size of the operation body, can be provided. When operation inputs are performed with operation bodies of various sizes, such as a finger cushion FC, a palm P, or the like, the contact areas on the operation surface 101A differ from each other in plan view. Accordingly, even if the distances in the Z direction between each electrode 111 and the operation bodies are the same, capacitances between each electrode 111 and the operation bodies differ from each other. However, by comparing the above-described corrected capacitance value CC with the threshold value TH3, whether a depressing operation has been performed can be correctly determined regardless of the sizes of the operation bodies.

When the operation surface 101A of the soft pad 101 having elasticity such as a foam material is pressed downward to a position of a predetermined depth, the distance between the operation body and the electrode changes and thus the capacitance changes. Accordingly, based on the capacitance, the input device 100 can detect that the operation surface 101A has been pressed downward to the position of the predetermined depth. The soft pad 101 is considered to be an elastic body having a predetermined spring constant, and the determination of the distance between the operation body and the electrode corresponds to the detection of a pressing force, and thus the soft pad 101 can be used substantially as a pressure sensor. To detect a depressing operation, a pressure sensor such as a strain element or a piezoelectric element may be used; however, in such a case, proximity is detected by using an electrostatic sensor and the pressure sensor is to be composed of a strain element or a piezoelectric element, and this may result in an expensive input device as a whole. The input device 100 can detect the position of a depressing operation based on capacitance, enabling the detection of the depressing operation substantially similarly to the case in which a pressure sensor is used, without using a pressure sensor of the strain type or the piezoelectric type. Since a strain type or piezoelectric type pressure sensor is not used in addition to the electrostatic sensor, the input device 100 configured to detect a depressing operation can be provided at a low cost.

In the above description, the embodiment has been described in which the determination section 141 determines whether a depressing operation has been performed. The depressing operation is an operation of pressing downward the operation surface 101A of the soft pad 101 to a position of a predetermined depth. The electrostatic sensor 110 can detect, not only the depressing operation onto the soft pad 101, but also detect a proximity operation that is a non-contact operation of moving away or toward to some extent the operation surface 101A, and a contact operation that is an operation of basically coming into contact with the operation surface 101A without depressing it. Accordingly, the determination section 141 can perform, for a proximity operation or a contact operation, processing similar to the above-described determination processing for a depressing operation. In such a case, the determination section 141 can similarly perform the detection of a distance from an electrode regardless of the size of the operation body.

Each of the plurality of electrodes 111 includes a plurality of electrode pieces, and when the capacitance value of any of the plurality of electrode pieces of an electrode 111 corresponding to any of the plurality of operation areas 101B is greater than or equal to a first threshold value TH1, the determination section 141 determines that the operation input has been performed by the operation body on the operation area 101B corresponding to the electrode 111. When none of the capacitance values of the plurality of electrode pieces is greater than or equal to the first threshold value TH1, based on a capacitance value CC, which is a difference value obtained by subtracting, from a total value Ct1 of the capacitance values of the electrode pieces of one electrode 111 of the plurality of electrodes 111, a value obtained by multiplying a total value Ct2 of the capacitance values of the plurality of electrode pieces of the electrodes 111 adjacent to the one electrode 111 by the coefficient k, the determination section 141 determines that the operation input has been performed by the operation body on the operation area 101B corresponding to the one electrode 111.

Accordingly, in the structure in which each electrode 111 is divided into a plurality of electrode pieces, an operation input by an operation body having a small area, such as a fingertip FT, can be detected. In the structure in which each electrode 111 is divided into a plurality of electrode pieces, it is possible to determine on which portion corresponding to any of the plurality of electrode pieces of each electrode 111 an operation input has been performed. Accordingly, the input device 100 configured to determine more correctly an operation input being performed by an operation body on an operation target, regardless of the size of the operation body, can be provided.

When the capacitance value CC, which is the difference value obtained by subtracting the value obtained by multiplying the total value Ct2 by the coefficient k from the total value Ct1, is greater than or equal to a second threshold value TH3, and when a distance between a contact center position CO obtained by weighting center positions Ce1, Ce2, and Ce3 of the plurality of electrode pieces of the one electrode 111 according to the capacitance values of the plurality of electrode pieces and a center C of the electrode 111 is less than or equal to a predetermined distance d, the determination section 141 determines that the operation input has been performed by the operation body on the operation area 101B that corresponds to the one electrode 111. With this configuration, depending on the distance between the center C of the electrode 111 and the contact center position CO obtained by weighting, when the position of the operation input is on the center side, it is possible to determine that the operation input has been performed, and when the position of the operation input is outside of the center side, it is possible to determine that the operation input has not been performed. Accordingly, the input device 100 configured to correctly determine an operation input being performed by an operation body on an operation target based on a distance from a center position of the plurality of electrode pieces of an electrode 111 and a contact center position CO obtained by weighting can be provided.

Each electrode 111, in plan view, is larger than the corresponding operation area 101B and includes the corresponding operation area 101B, and thus capacitance values can be acquired even when an operation input is being performed outside the operation area 101B. Accordingly, the input device 100 providing a wide area for operation input can be provided. In particular, with each electrode 111 having the plurality of divided electrode pieces, it is possible to determine that no operation input has been performed when an operation input is performed at a position far off the center of each operation area 101B corresponding to an end of any electrode piece outside of the operation area 101B. Accordingly, the input device 100 configured to determine more correctly an operation input being performed by an operation body on an operation target can be provided.

The plurality of electrode pieces have a shape obtained by radially dividing the electrode 111 in plan view. Accordingly, it is possible to determine at which position corresponding to which area of the plurality of radially divided areas of the entire electrode 111 in plan view an operation input has been performed.

The soft pad 101 made of a foam material disposed on the plurality of electrodes 111 is further provided, and the plurality of operation areas 101B is located on the operation surface 101A of the soft pad 101. Accordingly, an operation input can be performed by performing a depressing operation for pressing down the soft pad 101 and the input device 100 configured to correctly determine whether a depressing operation has been performed on the soft pad 101 can be provided.

The input device 100 includes the actuator 120 configured to transmit vibration to the soft pad 101 and the drive control section 142 configured to drive the actuator 120 when the determination section 141 determines that an operation input has been performed by the operation body. Accordingly, the input device 100 configured to inform the user of the completion of an operation input by providing vibration when the determination section 141 determines that the operation input has been performed can be provided.

When the capacitance value CC, which is the difference value obtained by subtracting the value obtained by multiplying the second total value Ct2 by the coefficient k from the first total value Ct1, is greater than or equal to a second threshold value TH3, and when a ratio of a maximum value to a minimum value of the capacitance values of the plurality of electrode pieces of the one electrode 111 is greater than or equal to a predetermined value, the determination section 141 may determine that the operation input has been performed by the operation body on the operation area 101B that corresponds to the one electrode 111. By determining in this way, without calculating the distance between the center position of the plurality of electrode pieces of one electrode 111 and the contact center position obtained by weighting the positions of the plurality of electrode pieces of the one electrode 111 according to the capacitance values of the plurality of electrode pieces, with simpler processing, it is possible to determine that no operation input has been performed when an operation input is performed at a position corresponding to an end of any electrode piece outside of the operation area 101B. Accordingly, the input device 100 configured to determine more correctly an operation input being performed by an operation body on the operation target can be provided.

In the above-described configuration, the threshold values for TH1 and TH2 are set assuming that distances between an operation body and electrodes have the same value, that is, a position K at which pressing amounts are the same. More specifically, for TH1, at a position K, the threshold value is set such that a state (a state in which it is within the area of one electrode piece) of the fingertip FT illustrated in FIG. 3A can be detected. The threshold value TH2 is set to be a value approximately 1.4 to 2 times greater than TH1 such that, at the position K, the state (the state it covers two electrode pieces) of the fingertip FT illustrated in FIG. 3B can be detected. However, the threshold value for TH3 is set assuming a position K' at which a depressing amount is less than that at the position K. More specifically, TH3 is set assuming that at the position k', where a depressing amount is less than that at the position K, a depressing operation is performed with the palm illustrated in FIG. 4A. This is because the palm has a larger area than the fingertip, and the same pressure can be applied with less pressing amount compared to the case in which the pressing operation is performed with the fingertip. In this embodiment, since the electrostatic sensor is used as a pressure sensor, when the pressure becomes greater than or equal to a predetermined pressure, it is determined that the predetermined operation has been performed.

Also in such a case, the determination of the amount of depressing with the palm in step S5 can be accurately performed compared to a case in which no correction is performed.

Although the plurality of electrodes 111 is disposed in a row in this embodiment, these electrodes 111 may be disposed in a matrix in plan view. In such a case, based on a capacitance value CC, which is a difference value obtained by subtracting, from the capacitance value of one electrode 111 of the plurality of electrodes 111, a value obtained by multiplying a total value of the capacitance values of α (α is an integer greater than or equal to 2) electrodes 111 adjacent to the perimeter of the one electrode 111 by a coefficient k (0<k<1/α), the determination section 141 may determine whether the operation input has been performed by the operation body on the operation area 101B corresponding to the one electrode 111. It should be noted that, for correction, it is necessary to consider that the correction value does not take a negative value and the coefficient k is to be a value less than 1/(the number of electrodes adjacent to the perimeter). Accordingly, even if the plurality of electrodes 111 is disposed in a matrix in plan view, the input device 100 configured to correctly determine an operation input being performed by an operation body to an operation target, regardless of the size of the operation body, can be provided.

Modifications

Figure 7:
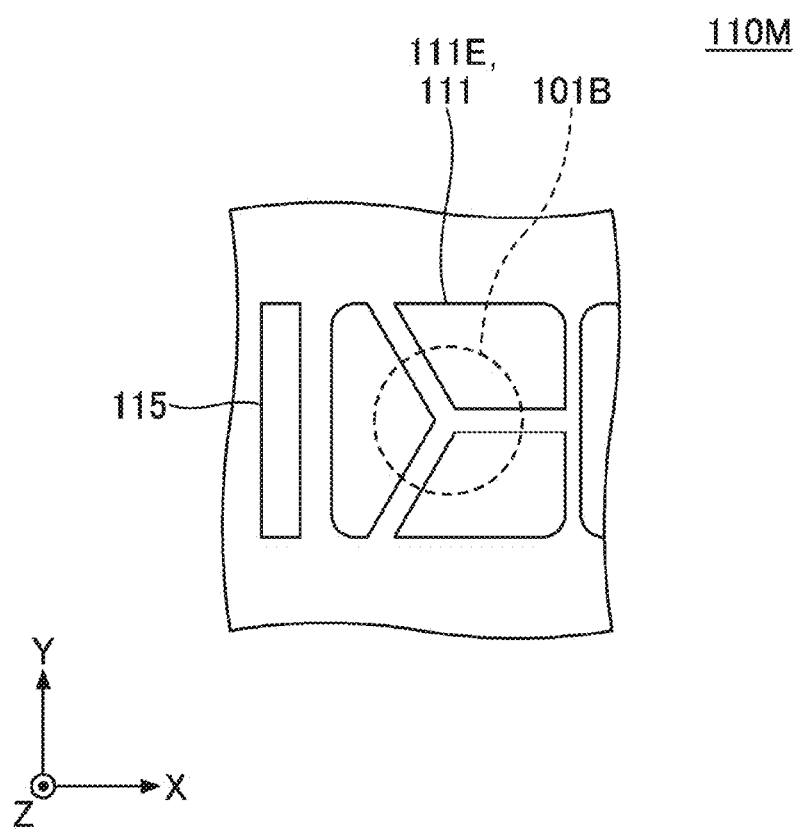
FIG. 7 illustrates a structure of an electrostatic sensor 110M according a modification of the embodiment.

FIG. 7 illustrates a structure of an electrostatic sensor 110M according a modification of the embodiment. The electrostatic sensor 110M includes electrodes 111A to 111E similarly to the electrostatic sensor 110 illustrated in FIG. 2. FIG. 7 illustrates the electrode 111E located at an end on the −X direction side and a portion of a second electrode 111D.

The electrostatic sensor 110M has a structure that includes a dummy electrode 115 added on the −X direction side of the electrode 111E located at the end of the electrostatic sensor 110M on the −X direction side. The dummy electrode 115 may be provided also on the +X direction side of the electrode 111A at the end on the +X direction side.

The dummy electrode 115 is connected to the detection section 130 and a capacitance value of the dummy electrode 115 is input to the determination section 141 via the detection section 130. The dummy electrode 115 is a dummy electrode that is disposed adjacent to the electrode 111 located at an end among the plurality of electrodes 111 and is used for calculation of a capacitance value CC, which is a difference value of capacitance values. The dummy electrode is used only to calculate a difference value of capacitance values and there is no operation area 101B that corresponds to the dummy electrode 115.

In the electrostatic sensor 110 in FIG. 2, only the electrode 111D is adjacent to the electrode 111E; however, in this modification, in calculating a capacitance value CC, which is a difference value of capacitance values for the electrode 111E, a value obtained by subtracting a value obtained by multiplying a total value of a capacitance value of the electrode 111D and a capacitance value of the dummy electrode 115 by a coefficient k from a capacitance value of the electrode 111E may be calculated as the capacitance value CC. Since the capacitance value CC that is the difference value considering the capacitance values of the electrode 111D and the dummy electrode 115 at both ends can be calculated also for the electrode 111E located at the end, the electrode 111E located at the end can be in increased symmetry with electrodes 111B to 111D, which are disposed such that there are electrodes 111 on both sides. Accordingly, the input device 100 configured to determine more correctly an operation input being performed by an operation body on an operation target, regardless of the size of the operation body, can be provided.

The input device 100 according to the disclosure can be used for applications other than in-vehicle use. In this embodiment, the electrostatic sensor 110 is used to detect pressure. When a predetermined pressing force is applied with a fingertip or a palm, the steps S3 to S5 are performed to determine that a predetermined operation has been performed. However, the electrostatic sensor 110 may also be used as a proximity or contact sensor, and at least one of the steps S3 and S4 may be omitted. In addition, the steps S6 and S7 in this embodiment may be omitted.

In addition, in the input device 100 according to the embodiment, the electrode 111 is divided into three electrode pieces, but it is not limited to three. In addition, the electrode 111 may be a single electrode without division. When the electrode 111 is a single electrode, the steps S4, S6, and S7 cannot be performed, and thus these steps may be omitted and in step S3, whether a measured capacitance value is greater than or equal to the threshold value TH1 may be determined and in step S5, a corrected capacitance value is obtained by subtracting a capacitance value of an adjacent electrode from the measured capacitance value, and a determination whether the corrected capacitance value is greater than or equal to the threshold value TH3 is performed.

While the input device according to the exemplary embodiment of the disclosure has been described, it is to be understood that the disclosure is not limited to this embodiment disclosed specifically, and various modifications or changes may be made without departing from the scope of the claims.

What is claimed is:

1. An input device comprising:
a plurality of electrodes corresponding to a plurality of operation areas disposed adjacent to each other, the electrodes being disposed on back sides of the plurality of operation areas;
a detection section configured to detect capacitance values of the plurality of electrodes; and
a determination section configured to determine whether an operation input has been performed by an operation body to any operation area of the plurality of operation areas based on the plurality of capacitance values detected by the detection section, wherein,
based on a difference value obtained by subtracting, from the capacitance value of one electrode of the plurality of electrodes, a value obtained by multiplying capacitance values of electrodes adjacent to the one electrode by a coefficient k, k being 0<k<1, the determination section determines whether the operation input has been performed by the operation body on the operation area corresponding to the one electrode.

2. The input device according to claim 1, wherein each of the plurality of electrodes includes a plurality of electrode pieces,
when the capacitance value of any of the plurality of electrode pieces of an electrode corresponding to any of the plurality of operation areas is greater than or equal to a first threshold value, the determination section determines that the operation input has been performed by the operation body on the operation area corresponding to the electrode, and when none of the capacitance values of the plurality of electrode pieces is greater than or equal to the first threshold value, based on a difference value obtained by subtracting, from a first total value of the capacitance values of the plurality of electrode pieces of one electrode of the plurality of electrodes, a value obtained by multiplying a second total value of the capacitance values of the plurality of electrode pieces of electrodes adjacent to the one electrode by the coefficient k, the determination section determines that the operation input has been performed by the operation body on the operation area corresponding to the one electrode.

3. The input device according to claim 2, wherein when the difference value obtained by subtracting the value obtained by multiplying the second total value by the coefficient k from the first total value is greater than or equal to a second threshold value, and when a distance between a contact center position obtained by weighting center positions of the plurality of electrode pieces of the one electrode according to the capacitance values of the plurality of electrode pieces and a center of the electrode is less than or equal to a predetermined distance, the determination section determines that the operation input has been performed by the operation body on the operation area that corresponds to the one electrode.

4. The input device according to claim 2, wherein when the difference value obtained by subtracting the value obtained by multiplying the second total value by the coefficient k from the first total value is greater than or equal to a second threshold value, and when a ratio of a maximum value to a minimum value of the capacitance values of the plurality of electrode pieces of the one electrode is greater than or equal to a predetermined value, the determination section determines that the operation input has been performed by the operation body on the operation area that corresponds to the one electrode.

5. The input device according to claim 2, wherein the plurality of electrode pieces has a shape obtained by radially dividing the electrode in plan view.

6. The input device according to claim 1, wherein each electrode is larger than the corresponding operation area and includes the corresponding operation area in plan view.

7. The input device according to claim 1, wherein the plurality of electrodes is disposed in a matrix in plan view, and based on a difference value obtained by subtracting, from the capacitance value of one electrode of the plurality of electrodes, a value obtained by multiplying a total value of the capacitance values of $\alpha$ electrodes adjacent to the perimeter of the one electrode by a coefficient k, $\alpha$ being an integer greater than or equal to 2, and k being $0<k<1/\alpha$, the determination section determines whether the operation input has been performed by the operation body on the operation area corresponding to the one electrode.

8. The input device according to claim 1, further comprising:

a dummy electrode disposed adjacent to an electrode of the plurality of electrodes located at an end, the dummy electrode being configured to be used for calculation of a difference value of capacitance values, wherein when one electrode of the plurality of electrodes is located at the end, based on a difference value obtained by subtracting, from a capacitance value of the one electrode, a capacitance value of the dummy electrode, the determination section determines whether the operation input has been performed by the operation body on the operation area corresponding to the one electrode.

9. The input device according to claim 1, further comprising:

a covering section made of a foam material disposed on the plurality of electrodes, wherein the plurality of operation areas is located on a surface of the covering section.

10. The input device according to claim 9, further comprising:

a vibration element configured to transmit vibration to the covering section; and a drive control section configured to drive the vibration element when the determination section determines that an operation input has been performed by the operation body.

* * * * *